(12) United States Patent
Shamsi et al.

(10) Patent No.: US 7,970,766 B1
(45) Date of Patent: Jun. 28, 2011

(54) ENTITY TYPE ASSIGNMENT

(75) Inventors: Farhan Shamsi, Rego Park, NY (US);
Alex Kehlenbeck, New York, NY (US);
David Vespe, New York, NY (US);
Nemanja Petrovic, Plainsboro, NJ (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 11/781,891

(22) Filed: Jul. 23, 2007

(51) Int. Cl.
*G06F 7/00* (2006.01)
*G06F 17/30* (2006.01)

(52) U.S. Cl. ........................................ 707/737; 707/803

(58) Field of Classification Search .................. None
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | 395/600 |
| 5,440,730 A | 8/1995 | Elmasri et al. | 395/600 |
| 5,475,819 A | 12/1995 | Miller et al. | 395/200.03 |
| 5,519,608 A | 5/1996 | Kupiec | 364/419.08 |
| 5,560,005 A | 9/1996 | Hoover et al. | 395/600 |
| 5,574,898 A | 11/1996 | Leblang | 395/601 |
| 5,680,622 A | 10/1997 | Even | 395/709 |
| 5,694,590 A | 12/1997 | Thuraisingham et al. | 395/600 |
| 5,701,470 A | 12/1997 | Joy et al. | 395/676 |
| 5,717,911 A | 2/1998 | Madrid et al. | 395/602 |
| 5,717,951 A | 2/1998 | Yabumoto | 395/831 |
| 5,778,373 A | 7/1998 | Levy et al. | 707/100 |
| 5,778,378 A | 7/1998 | Rubin | 707/103 |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 395/200.48 |

(Continued)

FOREIGN PATENT DOCUMENTS

JP 5-174020 12/1991

(Continued)

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.

(Continued)

*Primary Examiner* — Mohammad Ali
*Assistant Examiner* — Patrick A Darno
(74) *Attorney, Agent, or Firm* — Morgan, Lewis & Bockius LLP

(57) ABSTRACT

A repository contains objects including facts about entities. Objects may be of known or unknown entity type. An entity type assignment engine assigns entity types to objects of unknown entity type. A feature generation module generates a set of features describing the facts included with each object in the repository. An entity type model module generates an entity type model based on the sets of features generated for a subset of objects. An entity type model module generates entity type models, such as a classifier or generative models, based on the sets of features associated with objects of known entity type. An entity type assignment module generates a value based on the sets of features associated with an object of unknown entity type and the entity type model. This value indicates whether the object of unknown entity type is of a known entity type. An object update module stores the object to which the known entity type was assigned in the repository in association with the assigned entity type.

29 Claims, 12 Drawing Sheets

U.S. PATENT DOCUMENTS

| | | | | |
|---|---|---|---|---|
| 5,815,415 | A | 9/1998 | Bentley et al. | 364/578 |
| 5,819,210 | A | 10/1998 | Maxwell, III et al. | 704/9 |
| 5,819,265 | A | 10/1998 | Ravin et al. | 707/5 |
| 5,822,743 | A | 10/1998 | Gupta et al. | 706/50 |
| 5,826,258 | A | 10/1998 | Gupta et al. | 707/4 |
| 5,909,689 | A | 6/1999 | Van Ryzin | 707/203 |
| 5,920,859 | A | 7/1999 | Li | 707/5 |
| 5,943,670 | A | 8/1999 | Prager | 707/5 |
| 5,956,718 | A | 9/1999 | Prasad et al. | 707/10 |
| 5,974,254 | A | 10/1999 | Hsu | 395/703 |
| 5,987,460 | A | 11/1999 | Niwa et al. | 707/6 |
| 6,006,221 | A | 12/1999 | Liddy et al. | 707/5 |
| 6,018,741 | A | 1/2000 | Howland et al. | 707/102 |
| 6,038,560 | A | 3/2000 | Wical | 707/5 |
| 6,044,366 | A | 3/2000 | Graffe et al. | 707/2 |
| 6,052,693 | A | 4/2000 | Smith et al. | 707/104 |
| 6,064,952 | A | 5/2000 | Imanaka et al. | 704/9 |
| 6,073,130 | A | 6/2000 | Jacobson et al. | 707/5 |
| 6,078,918 | A | 6/2000 | Allen et al. | 707/6 |
| 6,112,203 | A | 8/2000 | Bharat et al. | 707/5 |
| 6,112,210 | A | 8/2000 | Nori et al. | 707/103 |
| 6,122,647 | A | 9/2000 | Horowitz et al. | 707/513 |
| 6,134,555 | A | 10/2000 | Chadha et al. | 707/102 |
| 6,138,270 | A | 10/2000 | Hsu | 717/3 |
| 6,202,065 | B1 | 3/2001 | Wills | 707/5 |
| 6,212,526 | B1 | 4/2001 | Chaudhuri et al. | 707/102 |
| 6,240,546 | B1 | 5/2001 | Lee et al. | 717/4 |
| 6,263,328 | B1 | 7/2001 | Coden et al. | 707/3 |
| 6,285,999 | B1 | 9/2001 | Page | 707/5 |
| 6,289,338 | B1 | 9/2001 | Stoffel et al. | 707/3 |
| 6,311,194 | B1 | 10/2001 | Sheth et al. | 707/505 |
| 6,327,574 | B1 | 12/2001 | Kramer et al. | 705/14 |
| 6,349,275 | B1 | 2/2002 | Schumacher et al. | 704/8 |
| 6,377,943 | B1 | 4/2002 | Jakobsson | 707/2 |
| 6,397,228 | B1 | 5/2002 | Lamburt et al. | 707/203 |
| 6,473,898 | B1 | 10/2002 | Waugh et al. | 717/168 |
| 6,487,495 | B1 | 11/2002 | Gale et al. | 701/209 |
| 6,502,102 | B1 | 12/2002 | Haswell et al. | 707/102 |
| 6,519,631 | B1 | 2/2003 | Rosenschein et al. | 709/219 |
| 6,556,991 | B1 | 4/2003 | Borkovsky | 707/6 |
| 6,567,846 | B1 | 5/2003 | Garg et al. | 709/218 |
| 6,567,936 | B1 | 5/2003 | Yang et al. | 714/37 |
| 6,572,661 | B1 | 6/2003 | Stern | 715/501.1 |
| 6,584,464 | B1 | 6/2003 | Warthen | 707/4 |
| 6,606,625 | B1 | 8/2003 | Muslea et al. | 707/6 |
| 6,606,659 | B1 | 8/2003 | Hegli et al. | 709/225 |
| 6,609,123 | B1 | 8/2003 | Cazemier et al. | 707/4 |
| 6,643,641 | B1 | 11/2003 | Snyder | 707/4 |
| 6,665,659 | B1 | 12/2003 | Logan | 707/3 |
| 6,665,666 | B1 | 12/2003 | Brown et al. | 707/5 |
| 6,665,837 | B1 | 12/2003 | Dean et al. | 715/501.1 |
| 6,693,651 | B2 | 2/2004 | Biebesheimer et al. | 345/837 |
| 6,704,726 | B1 | 3/2004 | Amouroux | 707/4 |
| 6,738,767 | B1 | 5/2004 | Chung et al. | 707/7 |
| 6,745,189 | B2 | 6/2004 | Schreiber | 707/10 |
| 6,754,873 | B1 | 6/2004 | Law et al. | 715/501.1 |
| 6,799,176 | B1 | 9/2004 | Page | 707/5 |
| 6,804,667 | B1 | 10/2004 | Martin | 707/6 |
| 6,820,081 | B1 | 11/2004 | Kawai et al. | 707/7 |
| 6,823,495 | B1 | 11/2004 | Vedula et al. | 715/805 |
| 6,832,218 | B1 | 12/2004 | Emens et al. | 707/3 |
| 6,845,354 | B1 | 1/2005 | Kuo et al. | 704/9 |
| 6,850,896 | B1 | 2/2005 | Kelman et al. | 705/10 |
| 6,873,982 | B1 | 3/2005 | Bates et al. | 707/5 |
| 6,886,005 | B2 | 4/2005 | Davis | 707/2 |
| 6,886,010 | B2 | 4/2005 | Kostoff | 707/3 |
| 6,901,403 | B1 | 5/2005 | Bata et al. | 707/101 |
| 6,904,429 | B2 | 6/2005 | Sako et al. | 707/3 |
| 6,957,213 | B1 | 10/2005 | Yuret | 707/4 |
| 6,963,880 | B1 | 11/2005 | Pingte et al. | 707/103 |
| 6,965,900 | B2 | 11/2005 | Srinivasa et al. | 707/102 |
| 7,003,506 | B1 | 2/2006 | Fisk et al. | 707/1 |
| 7,003,522 | B1 | 2/2006 | Reynar et al. | 707/10 |
| 7,003,719 | B1 | 2/2006 | Rosenoff et al. | 715/500.1 |
| 7,007,228 | B1 | 2/2006 | Carro | 715/513 |
| 7,013,308 | B1 | 3/2006 | Tunstall-Pedoe | 707/104.1 |
| 7,020,662 | B2 | 3/2006 | Boreham et al. | 707/104.1 |
| 7,043,521 | B2 | 5/2006 | Eitel | 709/202 |
| 7,051,023 | B2 | 5/2006 | Kapur et al. | 707/5 |
| 7,076,491 | B2* | 7/2006 | Tsao | 1/1 |
| 7,080,073 | B1 | 7/2006 | Jiang et al. | 707/7 |
| 7,080,085 | B1 | 7/2006 | Choy et al. | 707/101 |
| 7,143,099 | B2 | 11/2006 | Leheler-Moore et al. | 707/101 |
| 7,146,536 | B2 | 12/2006 | Bingham et al. | 714/26 |
| 7,158,980 | B2 | 1/2007 | Shen | 707/100 |
| 7,162,499 | B2 | 1/2007 | Lees et al. | 707/203 |
| 7,165,024 | B2 | 1/2007 | Glover et al. | 704/9 |
| 7,174,504 | B2* | 2/2007 | Tsao | 715/255 |
| 7,181,471 | B1 | 2/2007 | Ibuki et al. | 707/201 |
| 7,194,380 | B2 | 3/2007 | Barrow et al. | 702/181 |
| 7,197,449 | B2 | 3/2007 | Hu et al. | 704/9 |
| 7,216,073 | B2 | 5/2007 | Lavi et al. | 704/9 |
| 7,277,879 | B2 | 10/2007 | Varadarajan | 707/1 |
| 7,302,646 | B2 | 11/2007 | Nomiyama et al. | 715/764 |
| 7,305,380 | B1 | 12/2007 | Hoelzle et al. | 707/3 |
| 7,325,160 | B2* | 1/2008 | Tsao | 714/15 |
| 7,363,312 | B2 | 4/2008 | Goldsack | 707/102 |
| 7,376,895 | B2* | 5/2008 | Tsao | 715/243 |
| 7,409,381 | B1 | 8/2008 | Steel et al. | 707/3 |
| 7,472,182 | B1 | 12/2008 | Young et al. | 709/224 |
| 7,483,829 | B2 | 1/2009 | Murakami et al. | 704/10 |
| 7,493,308 | B1 | 2/2009 | Bair, Jr. et al. | 707/3 |
| 7,493,317 | B2 | 2/2009 | Geva | 707/3 |
| 7,587,387 | B2* | 9/2009 | Hogue | 1/1 |
| 7,672,971 | B2* | 3/2010 | Betz et al. | 709/203 |
| 7,685,201 | B2 | 3/2010 | Zeng et al. | 707/748 |
| 7,797,282 | B1 | 9/2010 | Kirshenbaum et al. | 707/651 |
| 2001/0021935 | A1 | 9/2001 | Mills | 707/513 |
| 2002/0022956 | A1 | 2/2002 | Ukrainczyk et al. | 704/9 |
| 2002/0038307 | A1 | 3/2002 | Obradovic et al. | 707/102 |
| 2002/0042707 | A1 | 4/2002 | Zhao et al. | 704/9 |
| 2002/0065845 | A1 | 5/2002 | Naito et al. | 707/500.1 |
| 2002/0073115 | A1 | 6/2002 | Davis | 707/500.1 |
| 2002/0083039 | A1 | 6/2002 | Ferrari et al. | 707/1 |
| 2002/0087567 | A1* | 7/2002 | Spiegler et al. | 707/100 |
| 2002/0107861 | A1* | 8/2002 | Clendinning et al. | 707/101 |
| 2002/0147738 | A1 | 10/2002 | Reader | 707/500 |
| 2002/0169770 | A1 | 11/2002 | Kim et al. | 707/5 |
| 2002/0174099 | A1 | 11/2002 | Raj et al. | 707/1 |
| 2002/0178448 | A1 | 11/2002 | Te Kiefte et al. | 725/46 |
| 2002/0194172 | A1 | 12/2002 | Schreiber | 707/4 |
| 2003/0018652 | A1 | 1/2003 | Heckerman et al. | 707/104.1 |
| 2003/0058706 | A1 | 3/2003 | Okamoto et al. | 365/200 |
| 2003/0069880 | A1 | 4/2003 | Harrison et al. | 707/3 |
| 2003/0078902 | A1 | 4/2003 | Leong et al. | 706/59 |
| 2003/0097357 | A1 | 5/2003 | Ferrari et al. | 707/3 |
| 2003/0120644 | A1 | 6/2003 | Shirota | 707/3 |
| 2003/0120675 | A1 | 6/2003 | Stauber et al. | 707/100 |
| 2003/0126102 | A1 | 7/2003 | Borthwick | 706/21 |
| 2003/0126152 | A1 | 7/2003 | Rajak | 707/101 |
| 2003/0149567 | A1 | 8/2003 | Schmitz et al. | 704/270 |
| 2003/0149699 | A1* | 8/2003 | Tsao | 707/100 |
| 2003/0154071 | A1 | 8/2003 | Shreve | 704/9 |
| 2003/0177110 | A1 | 9/2003 | Okamoto et al. | 707/3 |
| 2003/0182310 | A1 | 9/2003 | Charnock et al. | 707/104.1 |
| 2003/0195872 | A1 | 10/2003 | Senn | 707/3 |
| 2003/0195877 | A1 | 10/2003 | Ford et al. | 707/3 |
| 2003/0196052 | A1 | 10/2003 | Bolik et al. | 711/162 |
| 2003/0208354 | A1 | 11/2003 | Lin et al. | 704/9 |
| 2004/0003067 | A1 | 1/2004 | Ferrin | 709/223 |
| 2004/0024739 | A1 | 2/2004 | Copperman et al. | 707/1 |
| 2004/0059726 | A1 | 3/2004 | Hunter et al. | 707/3 |
| 2004/0064447 | A1 | 4/2004 | Simske et al. | 707/5 |
| 2004/0069880 | A1 | 4/2004 | Samelson et al. | 241/74 |
| 2004/0088292 | A1 | 5/2004 | Dettinger et al. | 707/4 |
| 2004/0107125 | A1 | 6/2004 | Guheen et al. | 705/7 |
| 2004/0122844 | A1* | 6/2004 | Malloy et al. | 707/102 |
| 2004/0122846 | A1 | 6/2004 | Chess et al. | 707/102 |
| 2004/0123240 | A1 | 6/2004 | Gerstl et al. | 715/513 |
| 2004/0128624 | A1 | 7/2004 | Arellano et al. | 715/530 |
| 2004/0143600 | A1 | 7/2004 | Musgrove et al. | 707/104.1 |
| 2004/0153456 | A1 | 8/2004 | Charnock et al. | 707/10 |
| 2004/0167870 | A1 | 8/2004 | Wakefield et al. | 707/1 |
| 2004/0177015 | A1 | 9/2004 | Galai et al. | 705/35 |
| 2004/0177080 | A1* | 9/2004 | Doise et al. | 707/100 |
| 2004/0199923 | A1 | 10/2004 | Russek | 719/310 |
| 2004/0243552 | A1 | 12/2004 | Titemore et al. | 707/3 |

| | | | |
|---|---|---|---|
| 2004/0255237 A1 | 12/2004 | Tong | 715/501.1 |
| 2004/0260979 A1 | 12/2004 | Kumai | 714/37 |
| 2004/0267700 A1 | 12/2004 | Dumais et al. | 707/2 |
| 2004/0268237 A1 | 12/2004 | Jones et al. | 715/513 |
| 2005/0076012 A1 | 4/2005 | Manber et al. | 707/3 |
| 2005/0080613 A1 | 4/2005 | Colledge et al. | 704/9 |
| 2005/0086211 A1 | 4/2005 | Mayer | 707/3 |
| 2005/0086222 A1 | 4/2005 | Wang et al. | 707/5 |
| 2005/0097150 A1 | 5/2005 | McKeon et al. | 707/202 |
| 2005/0108630 A1 | 5/2005 | Wasson et al. | 715/513 |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone | 707/3 |
| 2005/0240615 A1 | 10/2005 | Barsness et al. | 707/102 |
| 2005/0256825 A1 | 11/2005 | Dettinger et al. | 707/1 |
| 2006/0036504 A1 | 2/2006 | Allocca et al. | 705/26 |
| 2006/0041597 A1 | 2/2006 | Conrad et al. | 707/200 |
| 2006/0047838 A1 | 3/2006 | Chauhan | 709/230 |
| 2006/0053171 A1 | 3/2006 | Eldridge et al. | 707/203 |
| 2006/0053175 A1 | 3/2006 | Gardner et al. | 707/203 |
| 2006/0064411 A1 | 3/2006 | Gross et al. | 707/3 |
| 2006/0074824 A1 | 4/2006 | Li | 706/20 |
| 2006/0074910 A1 | 4/2006 | Yun et al. | 707/7 |
| 2006/0085465 A1 | 4/2006 | Nori et al. | 707/101 |
| 2006/0112110 A1 | 5/2006 | Maymir-Ducharme et al. | 707/100 |
| 2006/0123046 A1* | 6/2006 | Doise et al. | 707/102 |
| 2006/0136585 A1 | 6/2006 | Mayfield et al. | 709/224 |
| 2006/0143227 A1 | 6/2006 | Helm et al. | 707/103 |
| 2006/0143603 A1 | 6/2006 | Kalthoff et al. | 717/172 |
| 2006/0152755 A1 | 7/2006 | Curtis et al. | 358/1.15 |
| 2006/0224582 A1 | 10/2006 | Hogue | 707/6 |
| 2006/0238919 A1 | 10/2006 | Bradley | 360/128 |
| 2006/0242180 A1 | 10/2006 | Graf et al. | 707/101 |
| 2006/0248045 A1 | 11/2006 | Toledano et al. | 707/2 |
| 2006/0248456 A1 | 11/2006 | Bender et al. | 715/531 |
| 2006/0253418 A1 | 11/2006 | Charnock et al. | 707/1 |
| 2006/0259462 A1 | 11/2006 | Timmons | 707/3 |
| 2006/0277169 A1* | 12/2006 | Lunt et al. | 707/3 |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 |
| 2007/0016890 A1 | 1/2007 | Brunner et al. | 717/107 |
| 2007/0038610 A1 | 2/2007 | Omoigui | 707/3 |
| 2007/0055656 A1 | 3/2007 | Tunstall-Pedoe | 707/3 |
| 2007/0073768 A1 | 3/2007 | Goradia | 707/104.1 |
| 2007/0094246 A1 | 4/2007 | Dill et al. | 707/4 |
| 2007/0100814 A1 | 5/2007 | Lee et al. | 707/5 |
| 2007/0130123 A1 | 6/2007 | Majumder | 707/3 |
| 2007/0143282 A1 | 6/2007 | Betz et al. | 707/5 |
| 2007/0143317 A1* | 6/2007 | Hogue et al. | 707/100 |
| 2007/0150800 A1 | 6/2007 | Betz et al. | 715/500 |
| 2007/0198451 A1 | 8/2007 | Kehlenbeck et al. | 706/50 |
| 2007/0198480 A1 | 8/2007 | Hogue et al. | 707/3 |
| 2007/0198481 A1 | 8/2007 | Hogue et al. | 707/3 |
| 2007/0198503 A1 | 8/2007 | Hogue et al. | 707/5 |
| 2007/0198577 A1 | 8/2007 | Betz et al. | 707/103 |
| 2007/0198598 A1* | 8/2007 | Betz et al. | 707/201 |
| 2007/0198600 A1* | 8/2007 | Betz | 707/201 |
| 2007/0203867 A1 | 8/2007 | Hogue et al. | 706/48 |
| 2007/0208773 A1* | 9/2007 | Tsao | 707/103 R |
| 2007/0271268 A1 | 11/2007 | Fontoura et al. | 707/6 |
| 2008/0071739 A1 | 3/2008 | Kumar et al. | 707/3 |
| 2009/0006359 A1 | 1/2009 | Liao | 707/5 |
| 2009/0119255 A1 | 5/2009 | Frank et al. | 707/3 |

FOREIGN PATENT DOCUMENTS

| | | |
|---|---|---|
| WO | WO 01/27713 | 4/2001 |
| WO | WO 2004/114163 | 12/2004 |
| WO | WO 2006/104951 | 10/2006 |

OTHER PUBLICATIONS

Brill, E., et al., "An Analysis of the AskMSR Question-Answering System," Proceedings of the Conference of Empirical Methods in Natural Language Processing (EMNLP), Jul. 2002, pp. 257-264.

Brin, S., Extracting Patterns and Relations from the World Wide Web, 1999, 12 pages..

Brin, S., et al., "The Anatomy of a Large-Scale Hypertextual Web Search Engine," 7th Int'l World Wide Web Conference, Brisbane, Australia, Apr. 14-18, 1998, pp. 1-26.

Bunescu, R., et al., "Using Encyclopedia Knowledge for Named Entity Disambiguation," Department of Computer Sciences, University of Texas, retrieved from internet Dec. 28, 2006, 8 pages.

Chang, C., et al., "IEPAD: Information Extraction Based on Pattern Discovery," WWW 10 '01, ACM, May 1-5, 2001, pp. 681-688.

Chu-Carroll, J., et al., "A Multi-Strategy and Multi-Source Approach to Question Answering," 2006, 8 pages.

Craswell, N., et al., "Effective Site Finding using Link Anchor Information," SIGIR '01, Sep. 9-12, 2001, pp. 250-257.

Dean, J., et al., "MapReduce: Simplified Data Processing on Large Clusters," OSDI, 2004, pp. 1-13.

Dong, X., et al., "Reference Reconciliation in Complex Information Spaces," SIGACM-SIGMOD, 2005, 12 pages.

Downey, D., et al., "Learning Text Patterns for Web Information Extraction and Assessment," American Association for Artificial Intelligence, 2002, 6 pages.

Etzioni, O., et al., "Web-scale Information Extraction in KnowItAll (Preliminary Results)," WWW2004, ACM May 17-20, 2004, 11 pages.

Freitag, D., et al., "Boosted Wrapper Induction," American Association for Artificial Intelligence, 2000, 7 pages.

Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.

Gray, R.M., "Entropy and Information Theory," Springer-Verlag, New York, NY, 1990, pp. 17-46.

Guha, R., "Object Co-Identification on the Semantic Web," WWW2004, ACM, May 17-22, 2004, 9 pages.

Guha, R., et al., "Disambiguating People in Search," World Wide Web Conference, May 17-22, 2004, 9 pages.

Haveliwala, T.H., "Topic-Sensitive PageRank," Proceeding of the 11th Int'l World Wide Web Conference, Honolulu, Hawaii, May 7-11, 2002, pp. 1-23.

Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 3-106.

"Information Entropy," Wikipedia, the Free Encyclopedia, Retrieved on May 3, 2006, pp. 1-9.

"Information Theory," Wikipedia, the Free Encyclopedia,: Retrieved on May 3, 2006, pp. 1-12.

International Search Report and Written Opinion for International Application No. PCT/US2007/61156, mailed Feb. 11, 2008, 7 pages.

International Search Report and Written Opinion for International Application No. PCT/US2006/019807, mailed Dec. 18, 2006, 4 pages.

International Search Report and Written Opinion for International Application No. PCT/US2006/07639, mailed Sep. 13, 2006, 6 pages.

Jeh, G., et al., "Scaling Personalized Web Search," Proceedings of the 12th Int'l World Wide Web Conference, Budapest, Hungary, May 20-24, 2003, pp. 1-24.

Ji, H., et al., "Re-Ranking Algorithms for Name Tagging," Workshop on Computationally Hard Problems and Joint Inference in Speech and Language Processing, Jun. 2006, 8 pages.

Jones, R., et al., Bootstrapping for Text Learning Tasks, 1999, 12 pages.

Kolodner, J., "Indexing and Retrieval Strategies for Natural Language Fact Retrieval," ACM Trans. Database Syst. 8.3., Sep. 1983, 434-464.

Kosseim, L., et al., "Answer Formulation for Question-Answering," 11 pages, Oct. 1, 2007.

Liu, B. et al., "Mining Data Records in Web Pages," Conference 2000, ACM, 2000, pp. 1-10.

MacKay, D.J.C., "Information Theory, Inference and Learning Algorithms," Cambridge University Press, 2003, pp. 22-33, 138-140.

Mann, G. et al., "Unsupervised Personal Name Disambiguation," Proceedings of the Seventy Conference on Natural Language Learning at HLT-NAACL, 2003, 8 pages.

McCallum A., et al., "Object Consolidation by Graph Partitioning with a Conditionally-Trained Distance Metric," SIGKDD 03, ACM, Aug. 24-27, 2003, 6 pages.

Mihalcea, R., et al., PageRank on Semantic Networks, with Application to Word Sense Disambiguation, Proceedings of the 20th International Conference on Computational Linguistics, Aug. 23-27, 2004, 7 pages.

Mihalcea, R., et al., "TextRank: Bringing Order into Texts," Proceedings of the Conference on Empirical Methods in Natural Language Processing, Jul. 2004, 8 pages.

Page, L., et al., "The PageRank Citation Ranking: Bringing Order to the Web," Stanford Digital Libraries Working Paper, 1998, pp. 1-17.

Pawson, D., "Sorting and Grouping," www.dpawson.co.uk/xsl/sect2/N6280.html>, Feb. 7, 2004, pp. 1-19.

Prager, J. et al., "IBM's Piquant in TREC2003," 2003, 10 pages.

Prager, J., et al., "Question Answering Using Constraint Satisfaction: QA-by-Dossier-with-Constraints," 2004, 8 pages.

Ramakrishnan, G., et al., "Is Question Answering an Acquired Skill?" WWW2004, ACM May 17, 2004, pp. 111-120.

Richardson, M., et al., "Beyond Page Rank: Machine Learning for Static Ranking," International World Wide Web Conference Committee, May 23, 2006, 9 pages.

Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.

Rioloff, E., et al., "Learning Dictionaries for Information Extraction by Multi-Level Bootstrapping," American Association for Artificial Intelligence, 1999, 6 pages.

Shannon, C.E., et al., "A Mathematical Theory of Communication," The Bell System Technical Journal, vol. 27, Jul., Oct. 1948, pp. 1-55.

Sun Microsystems, "Attribute Names," http://java.sun.com/products/jndi/tutorial/basics/directory/attrnames.html>, Feb. 17, 2004, pp. 1-2.

Wang, Y., et al., "C4-2: Combining Link and Contents in Clustering Web Search to Improve Information Interpretation," The University of Tokyo, 2002, pp. 1-9.

Gigablast, Web/Directory, http://www.gigablast.com/?c=dmoz3, printed Aug. 24, 2010, 1 page.

Gilster, P., "Get Fast Answers, Easily," The News Observer, May 14, 2003, 2 pages.

Gao, X. et al, "Learning Information Extraction Patterns from Tabular Web Pages without Manual Labeling, Proceedings of the IEEE/WIC International Conference on Web Intelligence ," Jun. 2003, 4 pages.

Hsu, C., "Finite-State Transducers for Semi-Structured Text Mining," IJCAI-99 Workshop on Text Mining, http://www.cs.caltech.edu/csstuff/faculty.html, 1999.

Kosala, R., "Web Mining Research: A Survey," SIGKDD Explorations, vol. 2, Issue 1, Jul. 2000, 14 pages.

Lin, J. et al., "Question Answering from the Web Using Knowledge Annotation and Knowledge Mining Techniques", CIKM '03, Nov. 3-8, 2003, pp. 116-123.

Mihalcea, R., et al., "TextRank: Bringing Order into Texts," Proceedings of the Conference on Empirical Methods in Natural Language Processing, Jul. 2004, 8 pages.

Nyberg, E. et al., "The JAVELIN Question-Answering System at TREC 2003: A Multi-Strategy Approach with Dynamic Planning," TREC 2003, 9 pages.

Plaisant, C. et al. "Interface and Data Architecture for Query Preview in Networked Information Systems," Acm Transaction on Information Systems, vol. 17, Issue 3, Jul. 1999, 18 pages.

Wirzenius, L., "C Preprocessor Trick for Implementing Similar Data Types," http://liw.iki.fi/liw/texts/cpp-trick.html, Jan. 17, 2000, 9 pages.

Zhao, S. et al., "Corroborate and Learn Facts from the Web," KDD '07, Aug. 12-15, 2007, 9 pages.

Llyas, I. et al., "Rank-aware Query Optimization," Sigmod 2004, Jun. 13-18, 2004, 12 pages.

International Search Report for related PCT Appln. No. PCT/US2006/010965 dated Jul. 5, 2006, 4 pages.

Ogden, W. et al., "Improving Cross-Language Text Retrieval with Human Interactions," Proceedings of the 33rd Hawaii International Conference on System Sciences, IEEE 2000, 9 pages.

Etzioni, CO. et al., "Unsupervised Named-Entity Extraction from the Web: An Experimental Study," Journal Artificial Intelligence, vol. 165, Issue 1, Jun. 2005, 42 pages.

Nadeau, D. et al., "Unsupervised Named-Entity Recognition: Generating Gazetteers and Resolving Ambiguity," Lecture Notes in Computer Science, 2006, vol. -4013/2006, 12 pages.

Andritsos, P. et al., "Information-Theoretic Tools for Mining Database Structure from Large Data Sets," SIGMOD Jun. 13-18, 2004, 12 pages.

Chen, X et al., "A Scheme for Inference Problems Using Rough Sets and Entropy," RSFDGrC 2005, 10 pages.

Cover, T. et al., "Entropy, Relative Entropy and Mutual Information," Wiley-InterScience, New York, N.Y., 1991, 13 pages.

Information Theory, Wikepedia, the Free Encyclopedia, May 3, 2006, 12 pages.

Koeller, A. et al. "Approximate Matching of Textual Domain Attributes for Information Source Integration," IQIS 2005, Jun. 17, 2005, 10 pages.

Merriam-Webster Dictionary defines normalize as "To make conform to or reduce to a norm or standard, " 2010, 2 pages.

Merriam-Webster Dictionary defines "value" as "A numerical quantity that is assigned or is determined by . . . " 2010, 2 pages.

Microsoft Computer Dictionary defines "normalize" as "adjust No. within specific range" May 1, 2002, 4 pages.

Microsoft Computer Dictionary defines "quantity" "as a number", May 1, 2002, 4 pages.

Microsoft Computer Dictionary defines "value" as a quantity, May 1, 2002, 4 pages.

* cited by examiner

| Object ID=1 | Fact ID=10 |
| Object ID=1 | Fact ID=20 |
| Object ID=1 | Fact ID=30 |
| Object ID=2 | Fact ID=40 |

ENTITY TYPE ASSIGNMENT

TECHNICAL FIELD

The disclosed embodiments generally relate to fact databases or repositories. Specifically, the disclosed embodiments relate to methods of learning entity type models from objects in fact repositories and using these models to assign entity types to objects of unknown entity type in the fact repository.

BACKGROUND

Computational techniques such as information extraction are used to automatically identify and extract information in the form of facts. Information extraction can be performed on a variety of sources such as web pages to extract fact data. A set of facts collected from a source describing the same entity may be organized and can be stored as an object in a repository of facts.

Facts contain an attribute that describes an entity. The entity type of the entity is the type of real world thing the object represents (e.g. Person, Dog, Book, Movie). Entity type can be defined in a fact associated with the object. This entity type information is necessary to understand relationships between sets of facts associated with different objects. For example, an object with entity name "Hillary Clinton" is associated with a fact, "spouse Bill Clinton" and it is known that the attribute "spouse" always has a value with entity type "Person". Knowing that an object with entity name "Bill Clinton" has an entity type of "Person" enables the identification of a relationship between the two objects.

These relationships can be used to organize the sets of facts. Similarly, in cases where it is unclear whether or not a fact is valid, entity type is used in association with the attribute defined by the fact to assign a confidence to the fact. For example, an object with entity name "Bill Clinton" has an attribute "genre" with an associated value "political". If we know "genre" is only is used to describe a closed set of entity types such as "Book" and "Movie", knowing that "Bill Clinton" is of entity type "Book" can provide a better confidence in that fact.

Often the entity type of the entity represented by the object is unknown or confounded for a number of reasons. For instance, entity type information may not be available in the source data. Due to inherent error in information extraction, entity type information may not be extracted. The entity type of an object may also be confounded by several objects having the same name. For example, an object with entity name "Bill Clinton" could be either an object with entity type "Person" or an object with entity type "Book".

What is needed then is a computational method of assigning entity types to objects.

SUMMARY OF THE INVENTION

The above and other needs are met by methods, systems, and computer program products that assign entity types to objects with unknown entity type. Embodiments of the method comprise identifying a plurality of objects derived from electronic documents, each object including one or more facts describing an entity with which the object is associated, wherein each fact comprises an attribute. The method generates a set of features describing the facts included with the object for each of the plurality of objects. The method further identifies a subset of the plurality of objects of a known entity type. The method further generates an entity type model based on the sets of features generated for the objects in the identified subset. The method also generates a value based on an object of unknown entity type and the entity type model, wherein the value indicates whether the object of unknown entity type is of the known entity type. The method assigns the known entity type to the object of unknown entity type responsive to a determination that the value indicates the object of unknown entity type is of the known entity type and stores the object to which the known entity type was assigned.

Embodiments of the system and computer program product comprise a repository which stores a plurality of objects derived from electronic documents, each object including one or more facts describing an entity with which the object is associated, wherein each fact comprises an attribute. The system and computer program product also comprise a feature generation module adapted to generate, for each of the plurality of objects, a set of features describing the facts included with the object. An entity type model module adapted to generate an entity type model based on the sets of features generated for a subset of objects of a known entity type. The system and computer product further comprise an entity type model module adapted to generate an entity type model based on the sets of features generated for a subset of objects of a known entity type. The system and computer product further comprise an entity type assignment module adapted to generate a value based on an object of unknown entity type and the entity type model, wherein the value indicates whether the object of unknown entity type is of the known entity type. Finally, an object update module stores the object to which the known entity type was assigned.

BRIEF DESCRIPTION OF THE DRAWINGS

FIGS. 2(a)-2(d) are block diagrams illustrating a data structure for facts within a repository of FIG. 1 in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

Embodiments are now described with reference to the figures where like reference numbers indicate identical or functionally similar elements.

Figure 1:
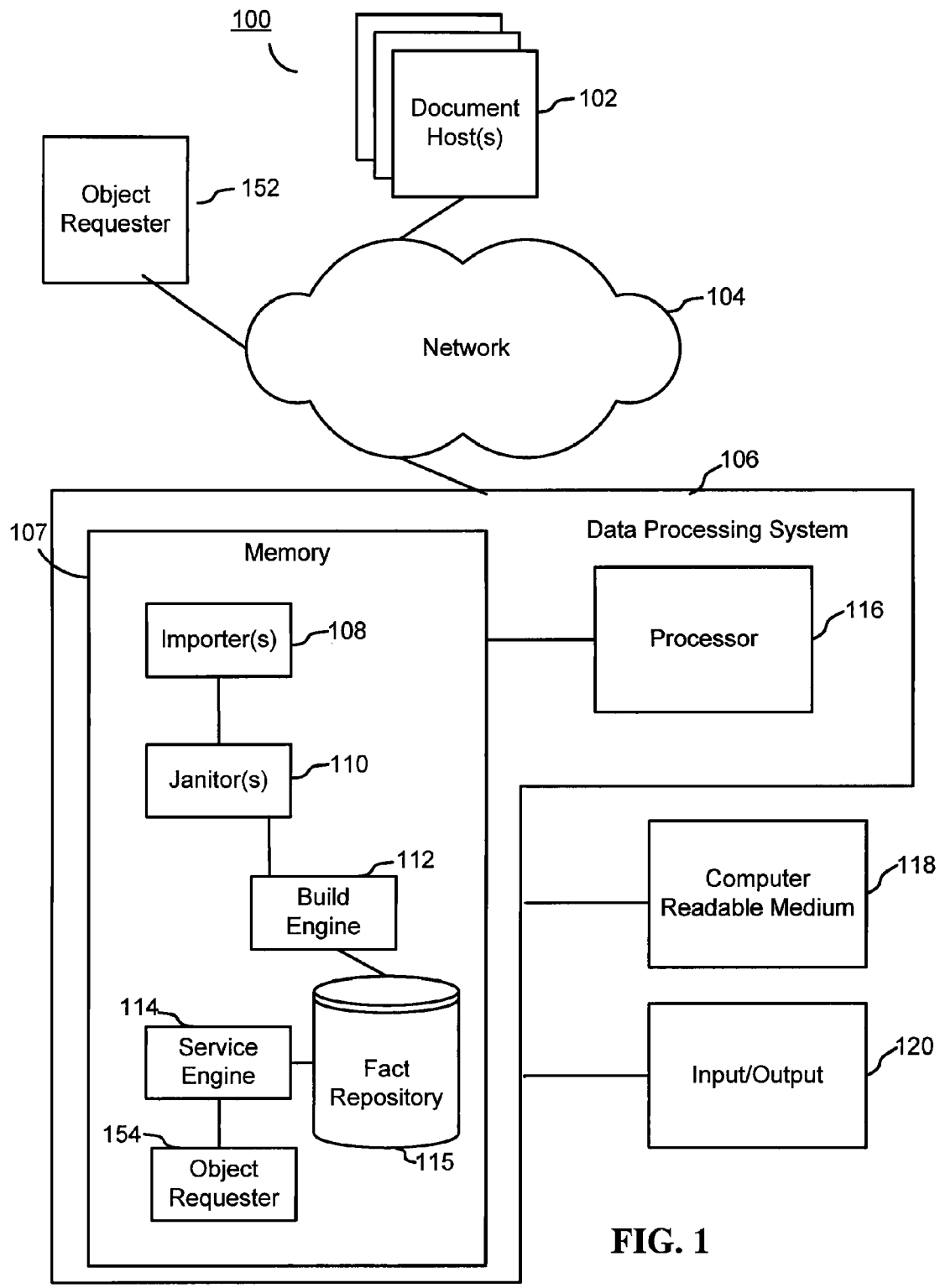
FIG. 1 shows a system architecture adapted to support one embodiment.

FIG. 1 shows a system architecture 100 adapted to support one embodiment. FIG. 1 shows components used to add facts into, and retrieve facts from, a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as Birthdate by one janitor and then another janitor might notice that 12/2/1981 and December 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(a)-2(d).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, importer the 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
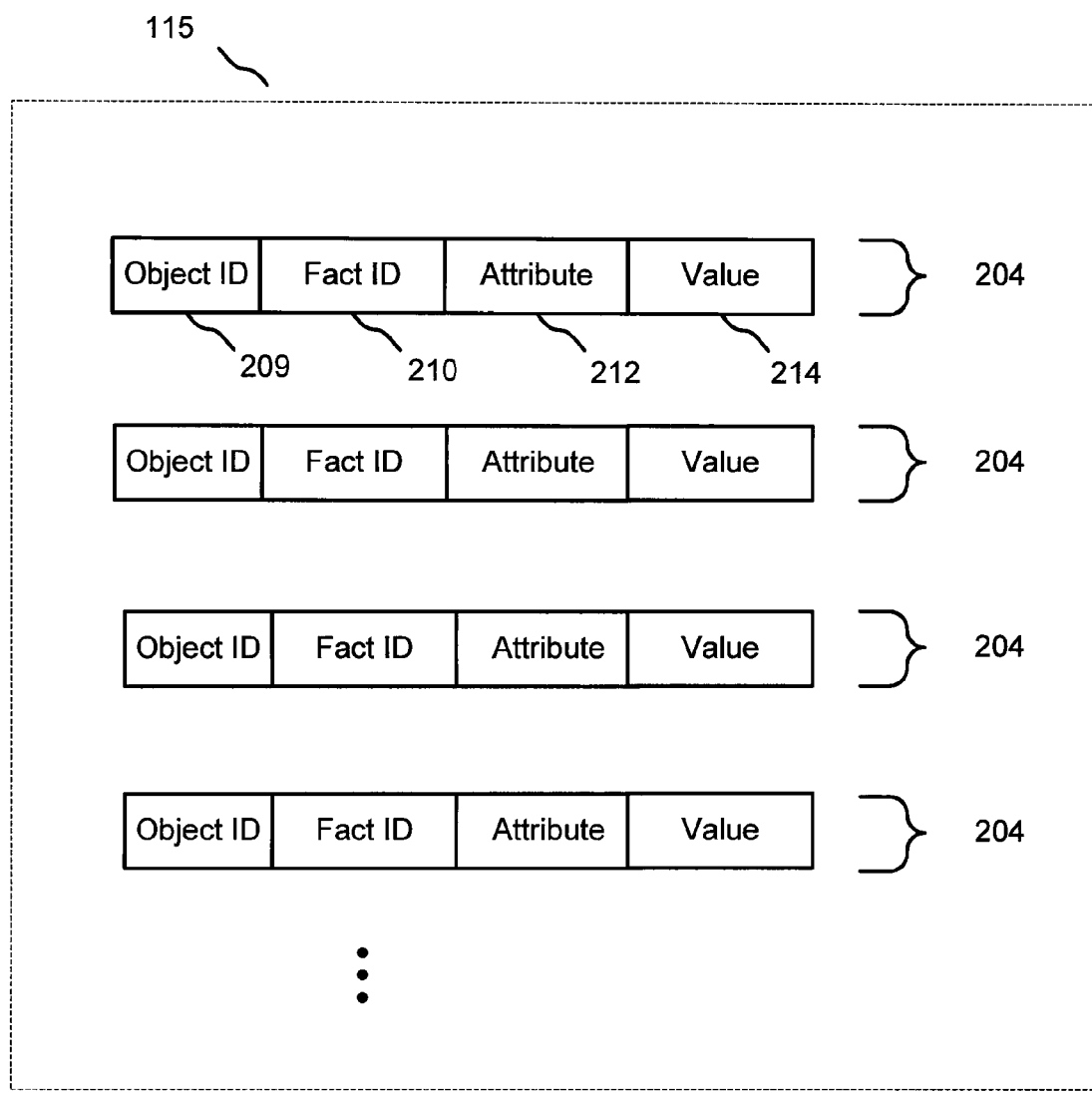

FIG. 2(a) shows an example format of a data structure for facts within the repository 115, according to some embodiments. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "February 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
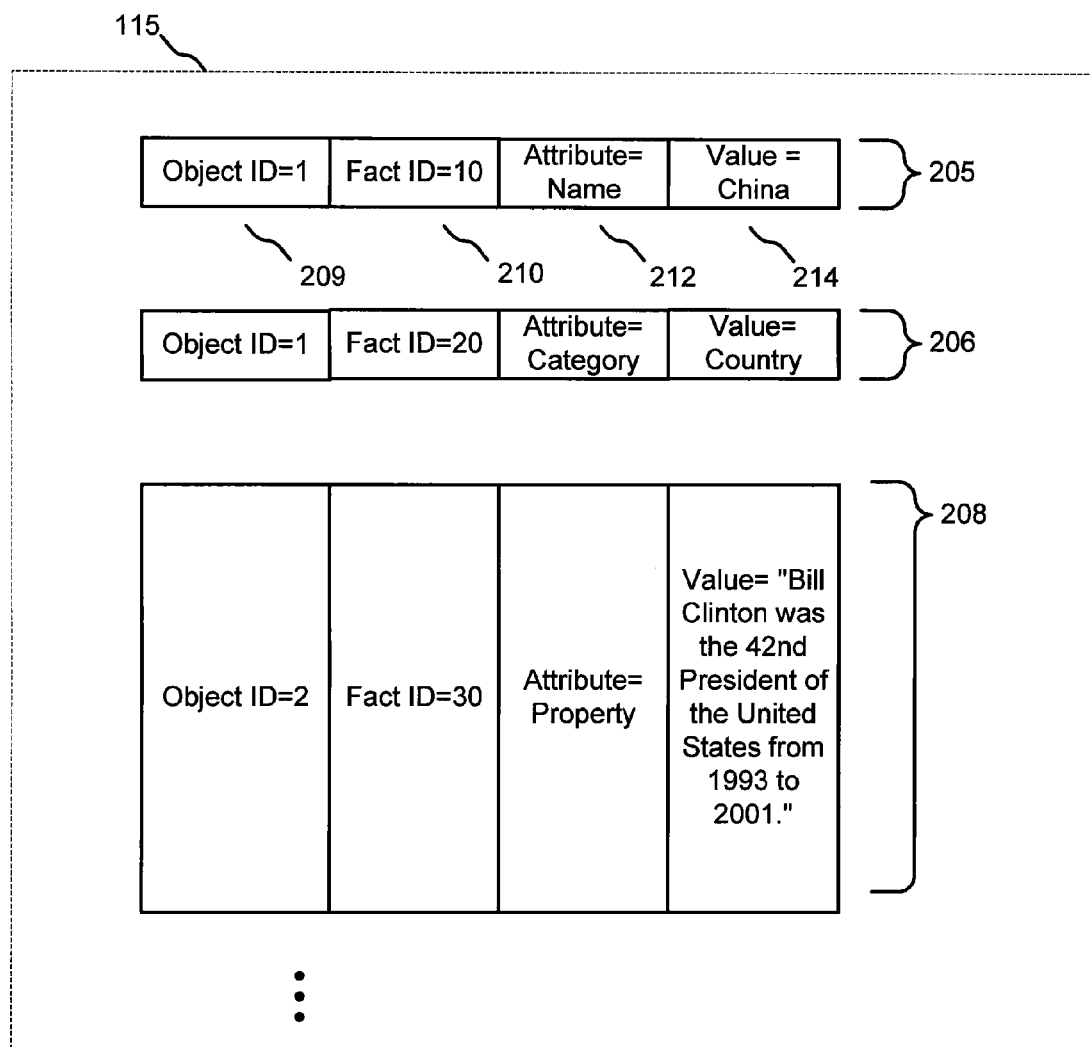

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of ""Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
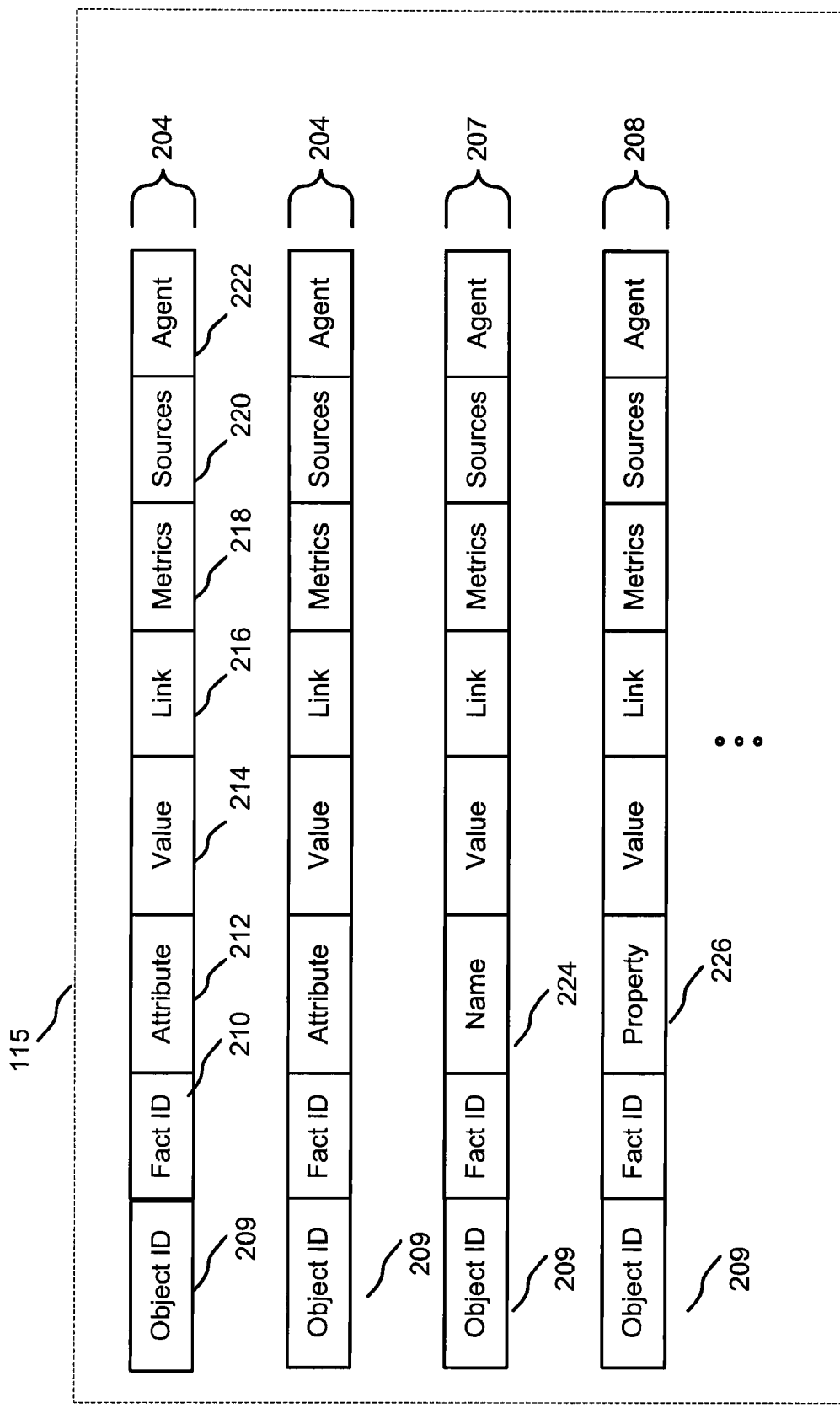

FIG. 2(d) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
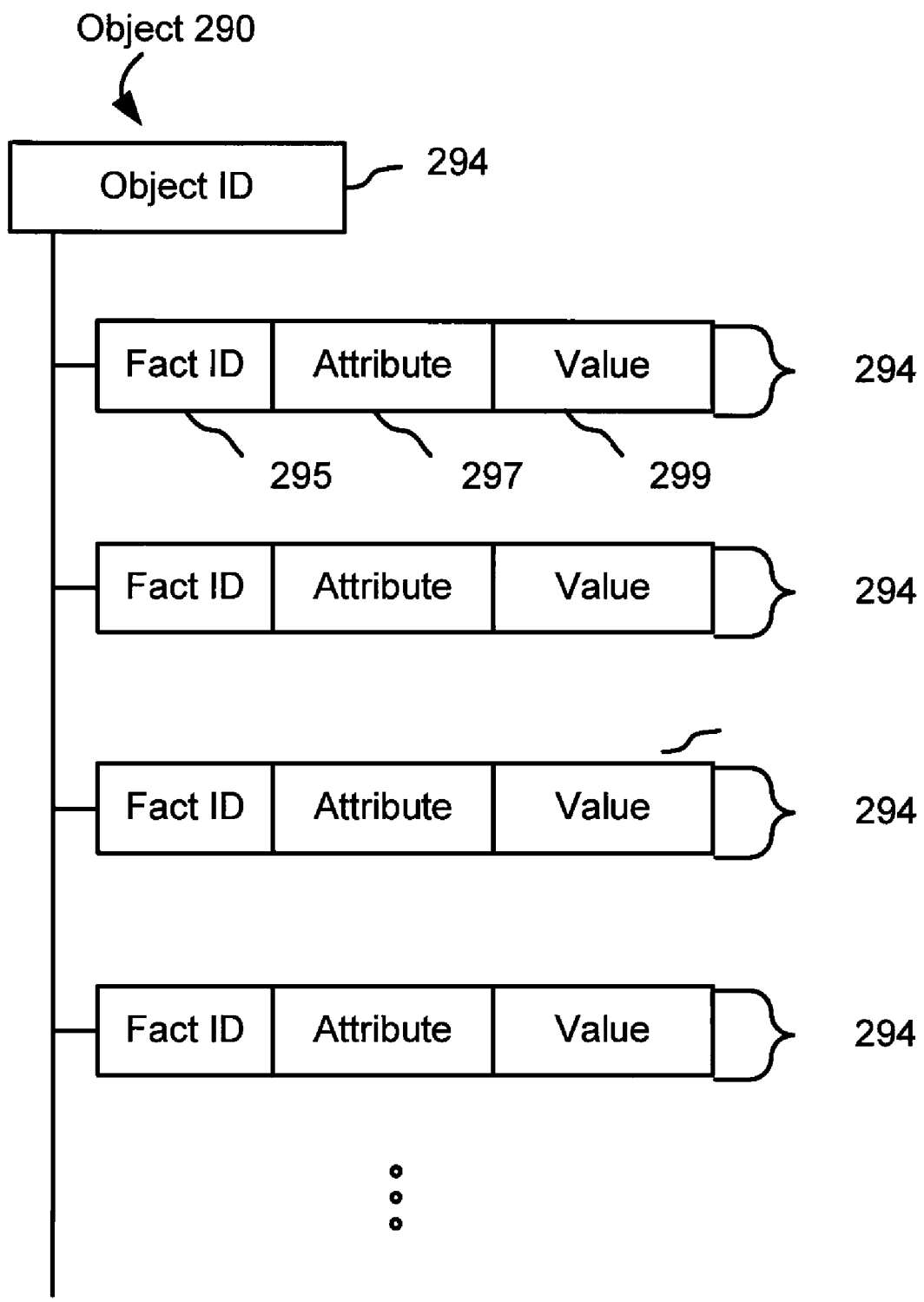
FIG. 2(e) is a block diagram illustrating an alternate data structure for facts and objects in accordance with some embodiments.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognized that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Figure 3:
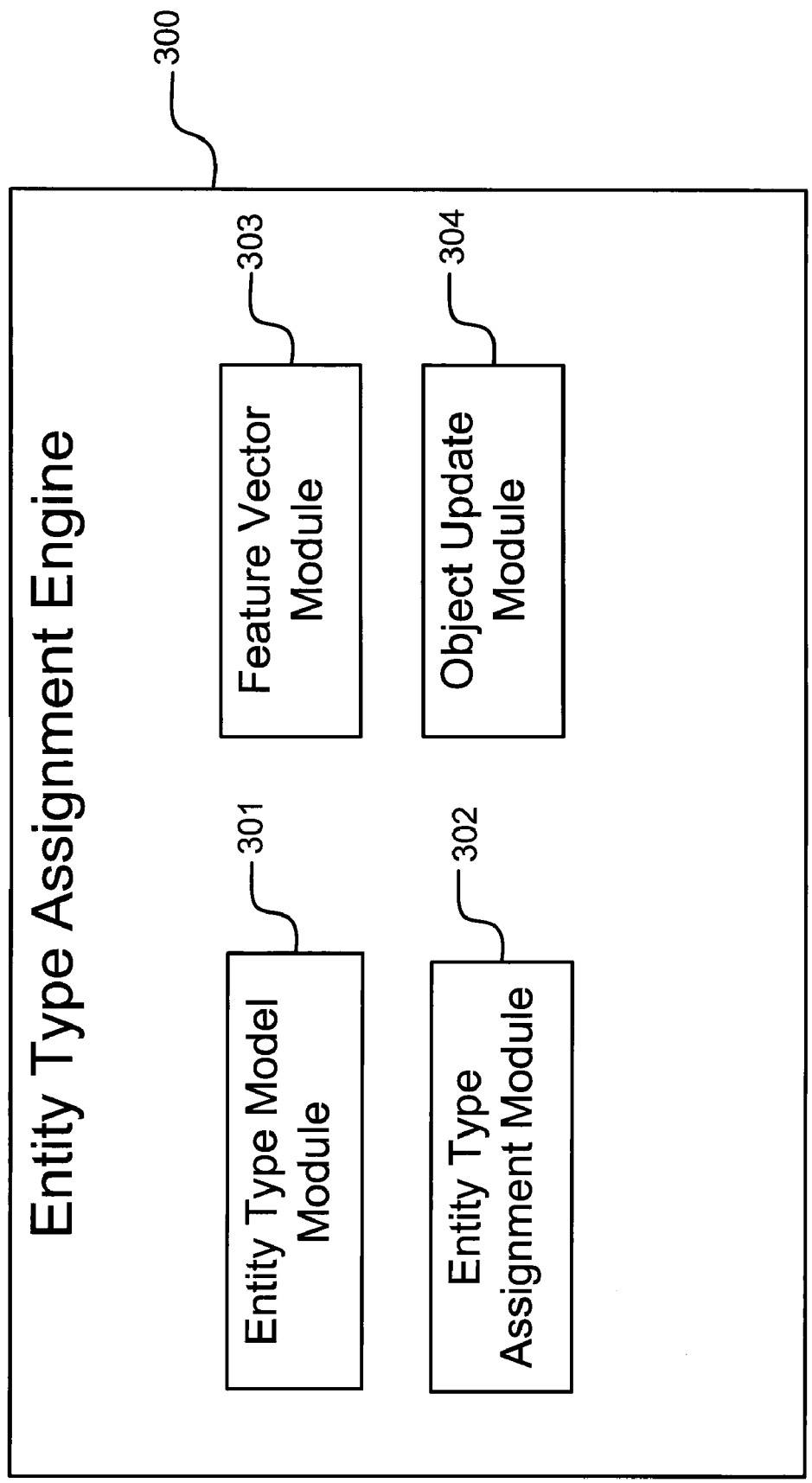
FIG. 3 is a block diagram illustrating an entity type assignment engine according to one embodiment.

FIG. 3 is a block diagram illustrating an entity type assignment engine 300 according to one embodiment. The entity type assignment engine 300 improves the quality of knowledge contained within the repository 115 by assigning entity types to objects with unknown entity type. The entity type of an object is the category of the "real world thing" or entity the set of facts contained within the object describe. Example entity types include "Book", "Movie", "Country", and "Person". In some embodiments, an entity type is represented as a special kind of fact associated with an object.

According to the embodiment, an entity may have a single entity type or multiple entity types. Some pairs or sets of entity types may be specified as conflicting. For instance, an object cannot be both a "Book" and a "Person". In some embodiments, non-conflicting entity types may be associated with an object. For instance, an object can have entity types for both a "Person" and a "Politician".

The entity type assignment engine 300 identifies objects in the repository 115 with unknown entity type and assigns entity types to these objects. Once assigned an entity type, objects are either stored in the repository 115 in place of, or in addition to the original objects with unknown entity type. Depending on the embodiment, additional information may be added to the repository 115 such as a new or updated metric 218 representing improved quality of the facts 204. New or updated metrics 218 can include the confidence level and the importance level of the facts 104.

An embodiment of the entity type assignment engine 300 is implemented as a janitor 110. However, the entity type assignment engine 300 can also be implemented by other entities shown in FIG. 1 and/or by another entity altogether. FIG. 3 illustrates that the entity type assignment engine 300 includes multiple modules for performing various functions. Some embodiments include different and/or additional modules than the ones shown in FIG. 3. Moreover, the functions attributed to the modules herein can be distributed among the modules in different ways.

An entity type model module 301 identifies the objects in the repository 115 with known entity types and generates entity type models representing each entity type. According to the embodiment, the entity type model module 301 may generate entity type models once or continuously regenerate entity type models to incorporate new objects with known or assigned entity type. Entity type models can be rebuilt continuously or at set time intervals such as every hour, day or week. Additionally, entity type models may be rebuilt based on the addition of new objects with known or assigned entity type to the repository.

Depending on the particular embodiment, different kinds of entity type models may be built by the entity type model module 301. In one embodiment, a binary classifier is built for each entity type (e.g. "Dog", "Book", "Country") providing an entity type model of each entity type relative to all other entity types. For example, a binary classifier for entity type "Dog" would classify objects as either "Dogs" or "Non-Dogs". Binary classifiers can be created with any type of binary classification algorithm such as support vector machines, neural networks, maximum entropy, boosting, bagging, and online gradient descent learning. Other binary classification algorithms will be apparent to those skilled in the art.

In some embodiments, a multi-class classifier is created by the entity type model module 301 created in place of, or in conjunction with, binary classifiers. As opposed to a binary classifier, a multi-class classifier creates a classification model or models for all entity types. Using the above example, a multi-class classifier creates models for and classifies an object as one of "Dog", "Book" and "Country". Though any multi-class classification algorithm may be employed in this method, some embodiments may include multi-class classification algorithms such as multi-class support vector machines, or maximum entropy.

In some embodiments, the entity type model module 301 uses generative techniques to create entity type models. Generative techniques can incorporate unsupervised or semi-supervised approaches to learn models of data. Unsupervised approaches such as clustering, expectation maximization or self-organizing maps automatically group data based on pattern recognition. Semi-supervised approaches such as n-means clustering, or transductive support vector machines contain some portion of data which is labeled according to entity type which directs pattern recognition. Other techniques for generative learning will be apparent to those skilled in the art.

The groups of data created using generative techniques are combined by the entity type model module 301 to form entity type models. One method of combining data from generative models is to generate a prototype for each group or cluster which can be used as an entity type model. A prototype may be created by combining group data in any suitable way such as averaging data, weighting data, probabilistic methods or any combination thereof.

The entity type assignment module 302 identifies objects of unknown entity type in the repository and assigns entity types to the objects of unknown entity type. The entity type assignment module 302 uses the classifiers and generative models computed by the entity type model module 301 to generate values used to assign entity type. According to the entity type model used, the values can represent a similarity to an entity type, the probability of an object having an entity type or a confidence value that the object has an entity type.

According to the embodiment, the object of unknown entity type is assigned an entity type by the entity type assignment module 302 based on a single value generated based on a single entity type model such as a binary classifier. If the generated single value is greater or less than a specified cutoff value, the object of unknown entity type is assigned the entity type of the model.

In some embodiments, the entity type assignment module 302 compares the object of unknown entity type to multiple classification models representing multiple entity types and assigns entity type based on multiple values. In embodiments where multiple values are generated, the entity type with the highest or lowest value can be selected for assigning an entity to the object of unknown entity type. Again, a threshold or cutoff value can be applied to the highest or lowest value to increase the stringency.

Using cutoff values, the entity type assignment module 302 will not assign objects of unknown entity an entity type due to weak probability or similarity values. Similarly, objects with same or close values for conflicting entity types will be identified as having conflicting values and will not be assigned an entity type.

The object update module 304 uses information from the entity type assignment module 302 to update the objects in the repository 115 with assigned entity types. In embodiments where entity type is represented by a fact, a new fact specifying entity type is added to the object. The object update module 304 may perform additional actions to clean up the repository. According to the embodiment, the object update module 304 may perform these actions as part of the entity type assignment engine 300 or in communication with another janitor 110.

In addition to updating entity types, the object update module 304 can update other object information such as the metrics 218 associated with the facts 204. The metrics 218 contain values representative of the confidence and importance of the fact. Newly assigned entity types can be used to reweigh other facts associated with the entities based on strong correlations between entity types and attributes 212 or values 214. In embodiments where entity type is represented as a fact 204, the confidence of the entity type fact can be increased due to entity type assignment.

In some embodiments, the object update module 304 identifies relationships between objects based on assigned entity type. Relationships can be represented as facts where the value 214 is another entity represented by another object, for instance, (spouse Hillary Clinton Bill Clinton). If we know that the value 214 described by the attribute 212 'spouse' is supposed to be a Person, then an object for Bill Clinton with entity type Person can be associated with the value.

The feature vector module 303 processes object data into feature vectors for use by the entity type assignment 302 and entity type model 301 modules. The feature vector module 303 creates several data points or features from the fact data associated with an object in the repository 115. Features can be represented in any way, such as text strings or alphanumeric symbols.

Features can incorporate any data contained in or associated with the fact or objects. Name facts 207 and property facts 209 are special types of facts which also may be incorporated into features. In most embodiments, feature vectors will contain features derived from data contained in the attribute 212 fields of the facts. Attributes 212 are represented within a field or slot in a feature vector.

Features can also incorporate value 214 data in conjunction with attribute 212 data. Attribute 212 and value 214 data can be combined or concatenated into one representative feature.

Numerical value 214 data may be binned or discretized in feature generation. Additionally, values may be incorporated which represent a closed set of categorical values such as genre or color.

Additional annotation information can be associated with the attribute 212. Attribute annotations may include various data associated with the attribute such as the entity type of the value they describe. For instance, the attribute "dateOfBirth" can have an annotation of "Date" representing the type of the value it describes. Attribute and annotation information can be combined in a single feature.

In additional to information contained within facts, features can also represent any information associated with the fact. An example of this is the source 220 of the fact such as the Uniform Resource Locator or the website from which the fact was collected or extracted.

The feature vector can also contain a weight representing the significance of a feature. Features may be weighted according to the metrics 218 associated with facts from with they were derived. Similarly, features may be weighted by the source 220 or importer 108 used to generate the fact. Features may also be weighted according to the type of fact from which they were derived. Different types of facts may be assigned different weights. For instance, special types of facts such as entity type facts or name facts 207 may be given a higher weight.

Figure 4:
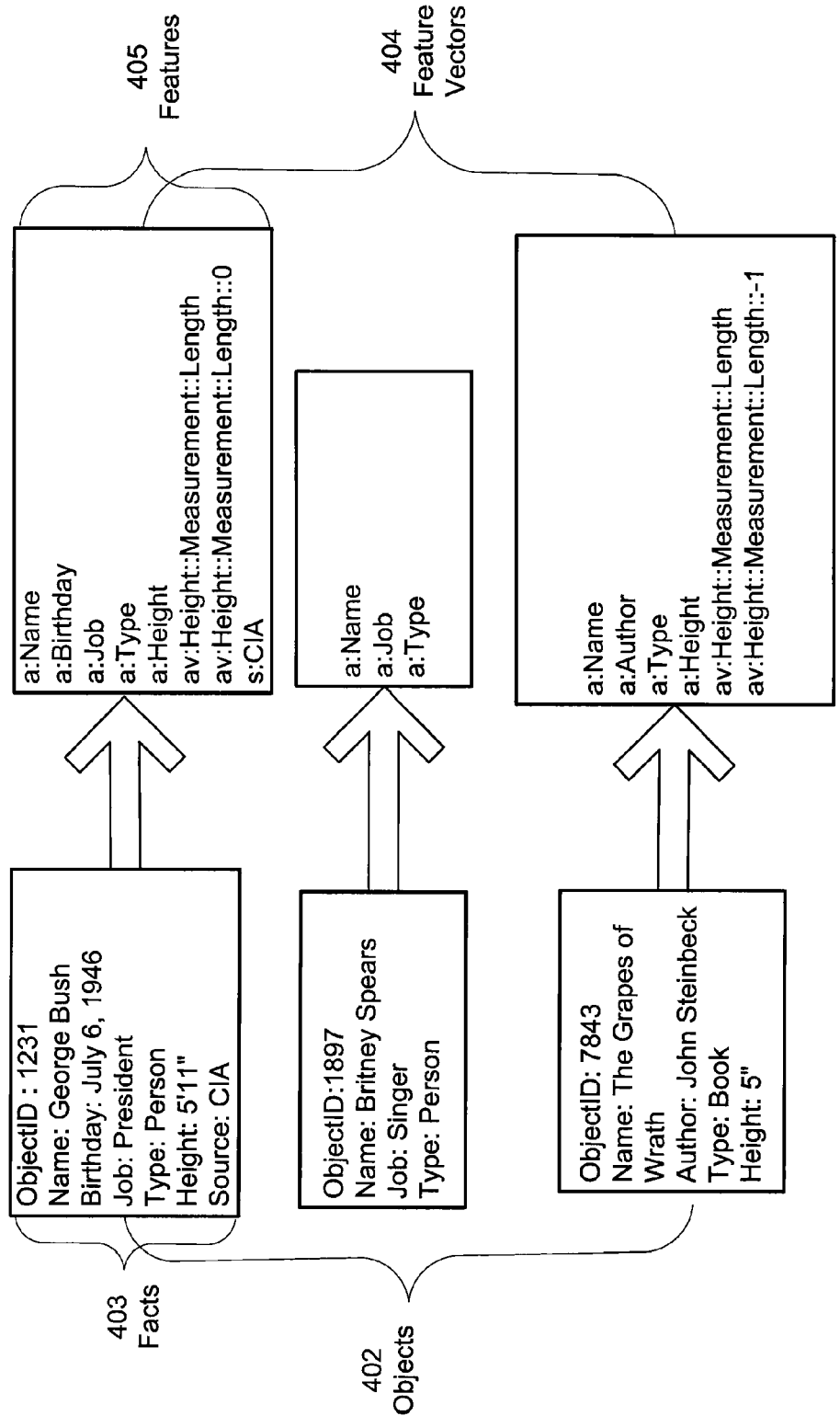
FIG. 4 provides an illustration of feature vector creation.

FIG. 4 is a diagram illustrating feature vector creation according to one embodiment. In the embodiment illustrated, three objects 402 are translated into feature vectors 404. In the diagram, the facts 403 are translated into features 405 based on an attribute contained within a fact or the attribute and the value of the fact. Additionally, the source of the information is translated into a feature value.

In this embodiment, features 405 contain symbols 'a', 'av', and 's' respectively used to denote that the feature contains an attribute 212, an attribute value 214, and the sources 220 of the facts 403 contained in the objects. The symbols are separated from the attribute with colons. In features containing values in addition to attributes, the values are further separated from the attributes by colons.

The embodiment illustrated provides an example of value discretization or "binning". The translation of the values 214 for attribute 212 'height' from facts into features transforms the fact values into an order to magnitude in meters. For instance, as George Bush is over 1 meter, the feature describing his height in magnitude of meters has a value of 0. Likewise, as the book Grapes of Wrath is less than 1 meter, the feature describing the height of the book in magnitude of meters has a value of −1.

FIGS. 5(*a*)-5(*d*) are flow charts illustrating steps performed by the entity type assignment engine 300 to assign entity types to objects in the repository 115 according to various embodiments of the present invention. Other embodiments perform different and/or additional steps than the ones shown in the figures described below. In addition, other embodiments perform the steps in different orders.

FIG. 5(*a*) is a flow chart illustrating the high level steps of assigning entity types according to an embodiment. Initially, the entity type model module 301 and the entity type assignment module 302 respectively identify 510 the objects in the repository with known and unknown entity types.

The feature vector module 303 generates 512 feature vectors for all the objects in the repository 115. The feature vector module 303 identifies 512 facts associated with the objects and generates 512 features based on these facts. As discussed above, the feature vector module 303 generates 512 features that contain the attribute and value of the facts. The feature vector module 303 also generates 512 features that contain information associated with the facts such as annotations or the source of the facts.

Figure 5A:
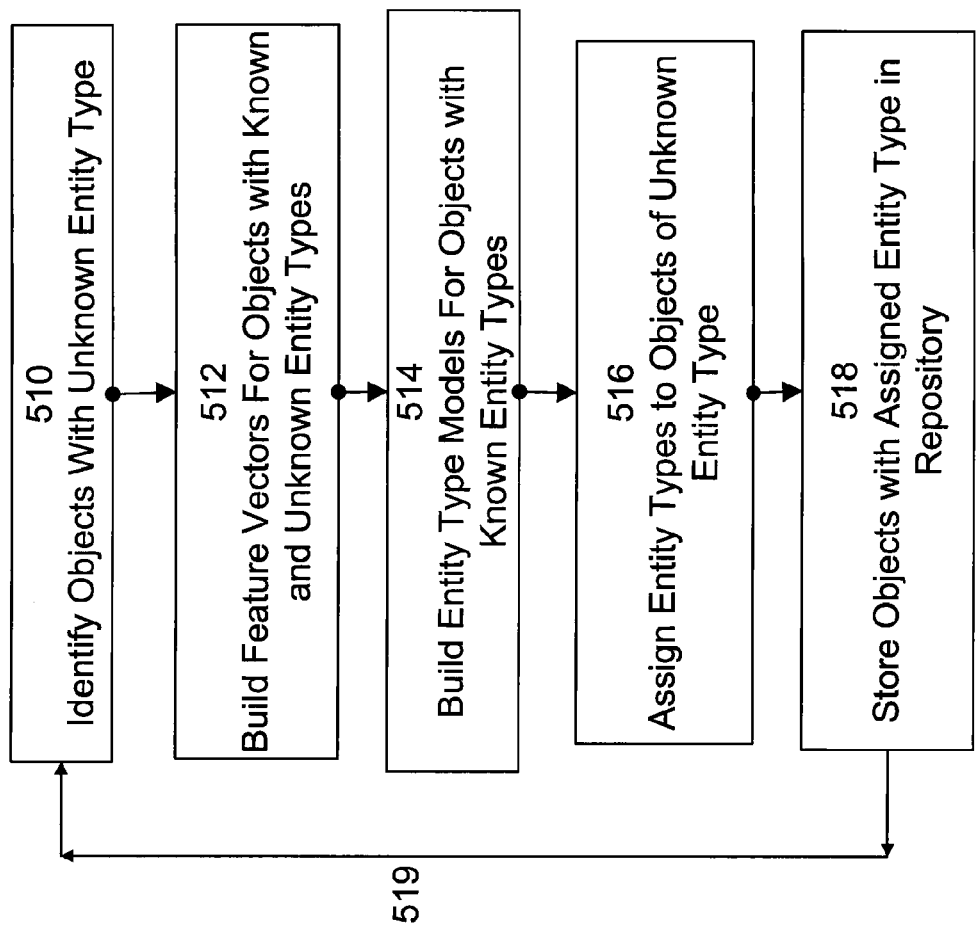
FIGS. 5(a)-5(d) are flow charts illustrating several methods of performing entity type assignment.
Figure 5B:
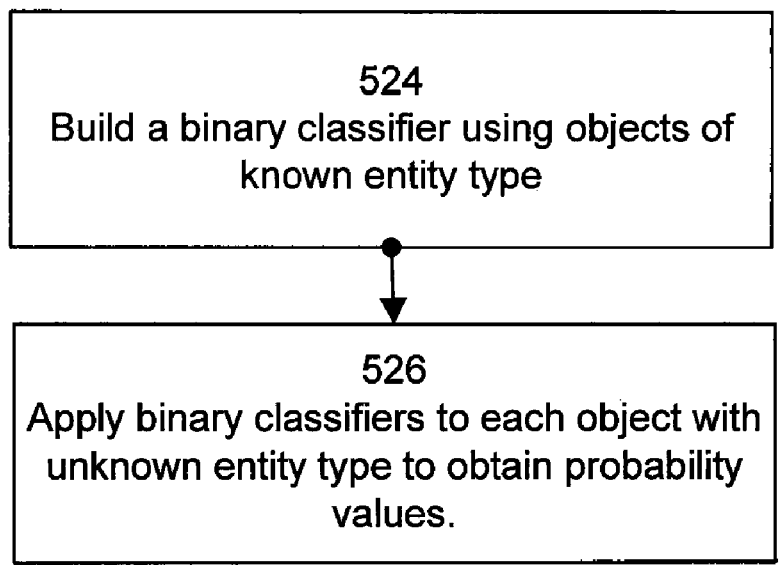
Figure 5C:
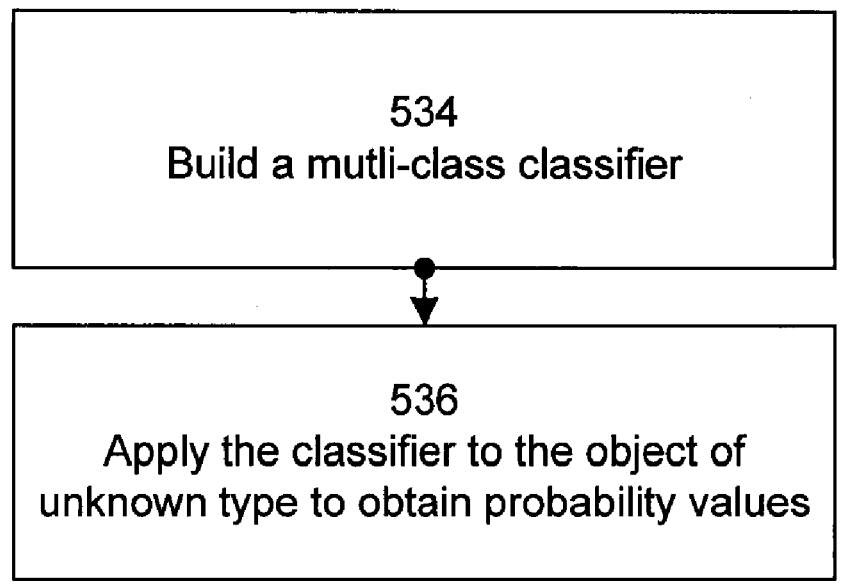
Figure 5D:
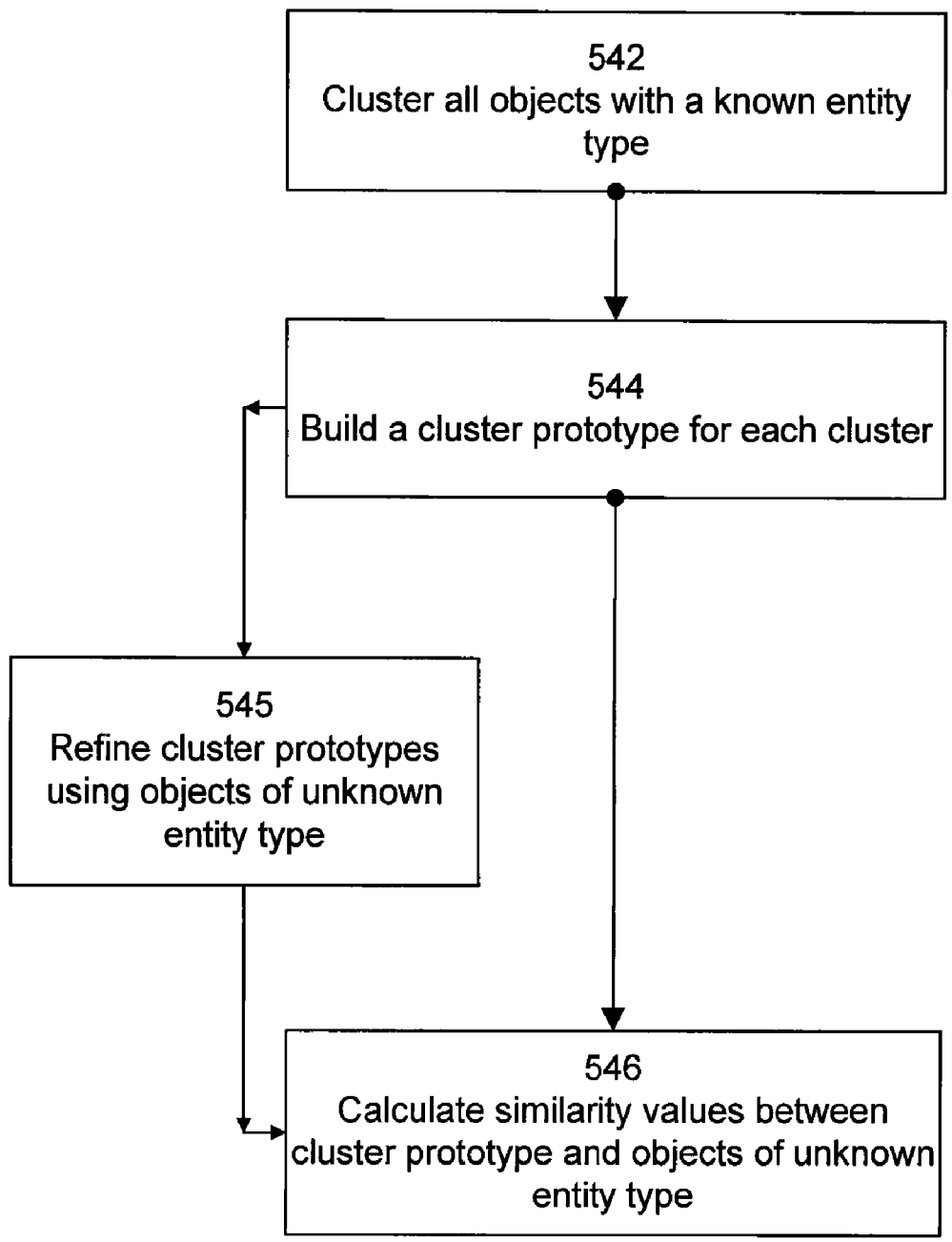

The entity type model module 301 generates 514 entity type models based on the entity type of the model. Embodiments that use binary classifiers, multi-class classifiers and generative techniques to generate 514 entity type models are illustrated in FIGS. 5*b*-5*d* and are discussed in detail below.

The entity type assignment module 302 applies 516 the set of entity type models generated by the entity type model module 301 to the objects of unknown entity type in order to generate 516 values which indicate the probability that the object of unknown entity type is of an entity type. The entity type assignment module 302 selects the highest value of the generated values for entity type assignment 516. The entity type assignment module also compares 516 the values with known conflicting entity types. If the object of unknown entity has similar values for two conflicting types, the object will not be assigned 516 a value. Otherwise, if the highest value generated is above a certain threshold, the object will be assigned 516 the entity type of the model used to generate that value.

The object update module 304 stores 518 the objects with assigned entity type in the repository 115. The object update module creates 518 a new fact specifying entity type which is associated with the objects of unknown entity to which entity type was assigned in step 512.

The process of assigning entity types may be iterated 519 to include the objects with assigned entity type in the entity type models.

In the embodiment illustrated in FIG. 5(*b*), binary classification models are generated 524 for each entity type. Using the objects of known entity type, a binary classifier is built 524 by the entity type model module 301. In a specific embodiment, the binary classifier is a stochastic gradient descent learning algorithm and a binary classifier is built 524 for each entity type contained within the objects of known entity type. In binary classification, objects are separated 524 into two classes, objects of a specific entity type and the set of all objects that are not of the specific entity type. In stochastic gradient descent learning, the features associated with the objects of the two classes are plotted in space. This plot is used to learn a geometric function which separates the two classes based on the features. This geometric function is used by the entity type assignment module 302 to assign entity types to objects of unknown entity type.

The entity type assignment module 302 applies 526 the function learned by the gradient descent algorithm for each entity type to each of the objects of unknown entity type. The entity type assignment module calculates a set of probability values for each object indicative of the probability the object is of each entity type (e.g. Dog 10%, Person 50%, Book 85%, Movie 92%).

FIG. 5(*c*) is a flow chart illustrating an embodiment using multi-class classifiers. Using the objects of known entity type, a multi-class classifier is built 534 by the entity type model module 301. In a specific embodiment, the multi-class classifier is built using a maximum entropy algorithm. Using the set of features associated with objects of different entity type, the maximum entropy algorithm learns an entity type model represented by a set of "constraints" or expected values for the features associated with each entity type that characterize the distribution of features for the entity type.

These learned models are then applied 536 by the entity type assignment module 302 as a multi-class classifier to estimate the conditional distribution of an object with unknown entity type. From the conditional distribution, a value indicative of the probability the object of unknown entity type has the entity type of the learned model is generated.

FIG. 5(d) is a flow chart illustrating the use of generative models such as mixture models to create entity type models according to one embodiment. Objects with known entity type are used learn groups or clusters of data representing entity types. The entity type model module 301 identifies all objects with known entity type and clusters them using, for example, simple bucketing. These techniques create a fixed number of clusters representing the number of different entity types. The resultant clusters are given a semantic label representing the entity type of the cluster 542.

Clusters with semantic labels are used to generate 544 entity type cluster prototypes. The entity type cluster prototypes are represented as vectors of probabilities, each probability associated with a feature. Each probability is determined by looking up the number of objects that have the feature and determining the fraction of occurrences of the feature over the different entity types associated with the objects. For example, the attribute 'mother' is identified as occurring 30 times in objects with entity type "Person", 14 times in objects with entity type "Dog" and 1 time in an object with entity type "Country". These numbers are then normalized to sum up to one. Using the above example would provide the following values: 0.66 for Person, 0.31 for Dog and 0.03 for Country. These normalized numbers are then associated with the features in the entity type cluster prototypes to represent the probability of the feature given the entity type of the entity type cluster prototype.

The entity type cluster prototypes are used by the entity type assignment module 302 to calculate 546 similarity values for objects of unknown entity type. The feature vectors created for the objects of unknown entity type are compared to the entity type cluster prototypes to calculate a similarity metric for each cluster prototype. The value of each feature associated with an object of unknown entity is identified as a probability in the cluster prototype. The identified probability values are then summed or combined to create a similarity value or "distance" between the object of unknown entity type and the entity type cluster prototypes. The similarity values are used to assign entity type to objects of unknown entity type based on the nearest cluster prototype as defined by the similarity values or "distances".

Semi-supervised learning approaches use both labeled and unlabelled data to learn statistical models for classification. According to the embodiment, the objects of unknown entity type may be used to refine 545 the cluster prototypes using semi-supervised learning such as expectation maximization. Expectation maximization is a two step learning algorithm, which is repeated until convergence.

In the expectation step, the feature vectors for each object are compared to the cluster prototypes using a set distance metric. The distances between the object of unknown entity type (e.g. object X) and the cluster prototypes are then normalized 545 to 1 representing the posterior probabilities that object X has each entity type. Object X is now fractionally assigned to several different clusters. Consequently, the features contained within object X now fractionally occur in the different entity type cluster prototypes.

In the maximization step, the entity type cluster prototypes are re-generated as in step 544 incorporating the posterior probabilities. The fractional assignment of objects to entity type clusters is used to weight the features in the entity type cluster prototype generation.

The expectation and maximization steps are iterated 545 until the cluster prototypes are stable, that is the probabilities associated with the features do not change over iterations between the two steps and the posterior probabilities associated with the objects of unknown entity type do not change. The refined entity type cluster prototypes are used by the entity type assignment module 302 to calculate 546 similarity values for objects of unknown entity type.

Through the construction of entity type models based on generated feature vectors, entity types are assigned to objects with unknown entity type. Various embodiments of generating entity type models, generating feature vectors and assigning entity types are disclosed herein. The process of assigning entity type to objects with unknown entity type may be performed iteratively.

Reference in the specification to "one embodiment" or to "an embodiment" means that a particular feature, structure, or characteristic described in connection with the embodiments are included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of assigning an entity type to an object of unknown entity type at a system, the system comprising one or more processors and memory storing one or more programs, the object stored in the memory, the method comprising:

creating a plurality of objects using facts derived from electronic documents, each object including one or more facts describing an entity with which the object is associated, wherein each fact comprises an attribute;

generating, for each of the plurality of objects, a set of features comprising one or more attributes in each of the plurality of objects;

identifying a subset of the plurality of objects of a known entity type;

generating an entity type model for the known entity type based on the sets of features generated for the objects in the identified subset;

generating a value for an object of unknown entity type by using the entity type model for the known entity type, wherein the value indicates whether the object of unknown entity type is of the known entity type;

assigning the known entity type to the object of unknown entity type in response to a determination that the value indicates the object of unknown entity type is of the known entity type; and storing the object to which the known entity type was assigned with the assigned entity type.

2. The method of claim 1 wherein the assigning comprises:
comparing the value to a defined threshold to determine whether the object of unknown entity type is of the known entity type.

3. The method of claim 1, wherein:
identifying the subset of the plurality of objects with the known entity type comprises identifying objects of different entity types;
generating the entity type model comprises generating a different entity type model for each of the different entity types;
generating the value comprises generating values for each of the different entity type models; and
the assigning comprises assigning the known entity type in response to a determination that a value of the values indicates that the object of unknown entity type is of the known entity type.

4. The method of claim 3, wherein the entity type models are generated based on a binary classification model, wherein the binary classification model classifies an object of unknown entity as being of a known entity type or not of a known entity type.

5. The method of claim 3, wherein the entity type models are generated based on a multiclass classification model, wherein the multiclass classification model classifies an object of unknown entity type as being of one of a plurality of different entity types.

6. The method of claim 3, wherein generating a different entity type model for each of the different entity types comprises:
generating a plurality of clusters based on clustering the plurality of objects; and
generating an entity type model for each cluster of the plurality of clusters.

7. The method of claim 1, wherein at least a feature of the set of features comprises an annotation associated with an attribute.

8. The method of claim 1, wherein a feature of the set of features comprises a value associated with an attribute.

9. The method of claim 1, wherein a respective feature of the set of features is extracted from the one or more facts derived from a web page.

10. The method of claim 1, wherein at least a subset of the facts have weights, the method further comprising updating the weights based on the entity type assigned to the object of unknown entity type.

11. The method of claim 1, further comprising identifying a relationship between the object of unknown entity type and a second object of a known entity type based on comparing the known entity type of the second object and the entity type assigned to the object of unknown entity type.

12. A computer-readable storage medium storing one or more programs for assigning an entity type to an object of unknown entity type, the one or more programs comprising instructions for:

creating a plurality of objects using facts derived from electronic documents, each object including one or more facts describing an entity with which the object is associated, wherein each fact comprises an attribute;

generating, for each of the plurality of objects, a set of features comprising one or more attributes in each of the plurality of the objects;

identifying a subset of the plurality of objects of a known entity type;

generating an entity type model for the known entity type based on the sets of features generated for the objects in the identified subset;

generating a value for an object of unknown entity type by using the entity type model for the known entity type, wherein the value indicates whether the object of unknown entity type is of the known entity type;

assigning the known entity type to the object of unknown entity type in response to a determination that the value indicates the object of unknown entity type is of the known entity type; and storing the object to which the known entity type was assigned with the assigned entity type.

13. The computer-readable storage medium of claim 12, the assigning comprises:

comparing the value to a defined threshold to determine whether the object of unknown entity type is of the known entity type.

14. The computer-readable storage medium of claim 12, wherein:

instructions for identifying a subset of the plurality of objects with a known entity type comprise instructions for identifying objects of different entity types;

instructions for generating an entity type model comprise instructions for generating a different entity type model for each of the different entity types;

instructions for generating a value comprise instructions for generating values for each of the different entity type models; and instructions for assigning comprise instructions for assigning the known entity type in response to a determination that a value of the values indicates that the object of unknown entity type is of the known entity type.

15. The computer-readable storage medium of claim 14, wherein the entity type models are generated based on a binary classification model, wherein the binary classification model classifies an object of unknown entity as being of a known entity type or not of a known entity type.

16. The computer-readable storage medium of claim 14, wherein the entity type models are generated based on a multiclass classification model, wherein the multiclass classification model classifies an object of unknown entity type as being of one of a plurality of different entity types.

17. The computer-readable storage medium of claim 14, wherein instructions for generating a different entity type model for each of the different entity types comprises instructions for:

generating a plurality of clusters based on clustering the plurality of objects; and generating an entity type model for each cluster of the plurality of clusters.

18. The computer-readable storage medium of claim 12, wherein at least a feature of the set of features comprises an annotation associated with an attribute.

19. The computer-readable storage medium of claim 12, wherein a feature of the set of features further comprises a value associated with an attribute.

20. The computer-readable storage medium of claim 12, wherein a respective feature of the set of features is extracted from the facts derived from a web page.

21. The computer-readable storage medium of claim 12, wherein at least a subset of the facts have weights, the one or more programs further comprising instructions for updating the weights based on the entity type assigned to the object of unknown entity type.

22. The computer-readable storage medium of claim 12, wherein the one or more programs further comprising instructions for identifying a relationship between the object of unknown entity type and a second object of a known entity type based on comparing the known entity type of the second object and the entity type assigned to the object of unknown entity type.

23. A computer system for assigning an entity type to an object of unknown entity type, having one or more processors and memory storing one or more programs, the object stored in the memory, the computer system comprising:

a repository comprising a plurality of objects created using facts derived from electronic documents, each object including one or more facts describing an entity with which the object is associated, wherein each fact comprises an attribute;

a feature generation module adapted to generate, for each of the plurality of objects, a set of features comprising one or more attributes in each of the plurality of the objects;

an entity type model module adapted to generate an entity type model for a known entity type based on the sets of features generated for a subset of objects of the known entity type;

an entity type assignment module adapted to generate a value for an object of unknown entity type by using the entity type model for the known entity type, wherein the value indicates whether the object of unknown entity type is of the known entity type;

the entity type assignment module is further adapted to assign the known entity type to the object of unknown entity type in response to a determination that the value indicates the object of unknown entity type is of the known entity type; and an object update module adapted to store the object to which the known entity type was assigned with the assigned entity type.

24. The computer system of claim 23, wherein the entity type assignment module is further adapted to:

compare the value to a defined threshold to determine whether the object of unknown entity type is of the known entity type.

25. The computer system of claim 23, wherein:

the entity type model module is further adapted to generate a different entity type model for each of the different entity types; and the entity type assignment module is further adapted to generate a value for each of the different entity type models and assign the known entity type in response to a determination that a value of the values indicates that the object of unknown entity type is of the known entity type.

26. The computer system of claim 25, wherein the entity type model module is further adapted to generate a different entity type model for each of the different entity types based on a binary classification model, wherein the binary classification model classifies an object of unknown entity as being of a known entity type or not of a known entity type.

27. The computer system of claim 25, wherein the entity type model module is further adapted to generate a different entity type model for each of the different entity types based on a multiclass classification model, wherein the multiclass classification model classifies an object of unknown entity type as being of one of a plurality of different entity types.

28. The computer system of claim 25, wherein the entity type model module is further adapted to:

generate a plurality of clusters based on clustering the plurality of objects of known entity type, each cluster representing a different entity type model; and generate for each cluster of the plurality of clusters, an entity type model.

29. The computer system of claim 23, wherein at least a subset of the facts have weights, and the object update module is further adapted to update the weights based on the entity type assigned to the object of unknown entity type.

* * * * *